April 21, 1970     C. E. LENZ     3,508,246
FINE-RESOLUTION DIGITAL POSITION ENCODER
Filed June 11, 1965     3 Sheets-Sheet 1

INVENTOR.
CHARLES E. LENZ
BY
ATTORNEY

April 21, 1970  C. E. LENZ  3,508,246
FINE-RESOLUTION DIGITAL POSITION ENCODER
Filed June 11, 1965  3 Sheets-Sheet 2

INVENTOR.
CHARLES E. LENZ
BY
ATTORNEY

INVENTOR.
CHARLES E. LENZ

United States Patent Office 3,508,246
Patented Apr. 21, 1970

3,508,246
FINE-RESOLUTION DIGITAL POSITION ENCODER
Charles E. Lenz, Fullerton, Calif., assignor to North American Rockwell Corporation, a corporation of Delaware
Filed June 11, 1965, Ser. No. 463,090
Int. Cl. G08c 1/00
U.S. Cl. 340—347
9 Claims

ABSTRACT OF THE DISCLOSURE

A position encoder for generating digital signals as a function of angular or linear position, wherein a periodically varying signal, modulated as a function of input position, is applied to a zero crossing detector which produces enabling signals as a function of the phase of the input signal. Counter means, responsive to the enabling signals, provides first pulses of predetermined duration as a function of alternate enabling signals and second pulses of predetermined duration as a function of the remaining enabling signals. A motion detector responsive to the first and second pulses provides a first output pulse when the first and second pulses are simultaneously true and a second output pulse when the first and second pulses are simultaneously false.

---

This invention pertains to a position encoder system for converting angular or linear position to a corresponding digital signal or more particularly to an encoder system which first transforms shaft angle or linear displacement into a proportional carrier-signal phase shift and then converts this phase shift into a digital signal.

Some of the particular advantages of the invention are: freedom from fundamental limitations of many earlier encoders in respect to ultimate resolution and physical size; the ability to convert a standard resolver in an existing system to a digital encoder, thereby providing the advantages of digital data transmission and compatibility with a digital computer without extensive system modification; and the ability to very accurately measure either rotary or linear motion directly without mechanical linkages which are susceptible to wear, backlash, or inaccuracy.

These advantages are achieved by converting shaft angle to a carrier phase shift by utilizing a transducer such as an optical or electromagnetic resolver having any speed or number of pole pairs. Logical elements then convert the resultant phase-shifted carrier to an incremental digital signal such that each pulse on the first or second of two signal lines represents an increment of clockwise or counterclockwise motion.

To achieve these advantages it becomes a major object of the present invention to provide an encoder for converting angular or linear position to a corresponding digital signal.

It is another object of this invention to provide an improved encoder for generating a digital output signal of finer resolution than heretofore attainable.

It is a further object of this invention to provide a unique position encoder system.

It is still a further object of this invention to provide a fine-resolution digital position encoder for converting angular or linear position to an incremental or whole-value digital signal.

These and other objects of the present invention will become more apparent when taken in conjunction with the following description and drawings in which.

THE SYSTEM

It is to be understood that although an angular type encoder will be specifically described, it will be obvious to those persons skilled in the art how to apply the invention disclosed herein to encode linear motion.

Figure 1:
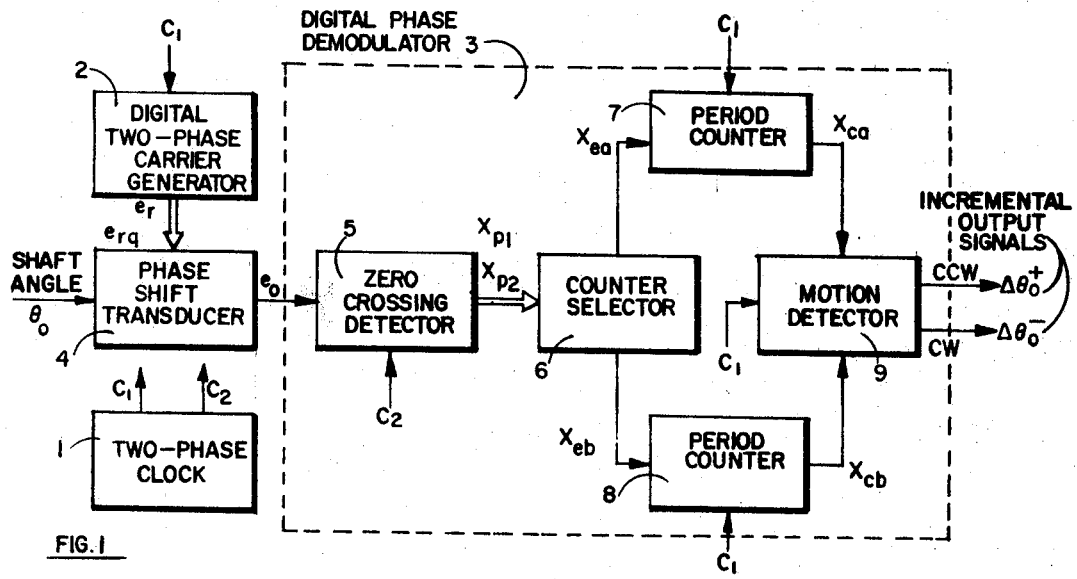
FIG. 1 is a block diagram of the position encoder system.
Figure 2:
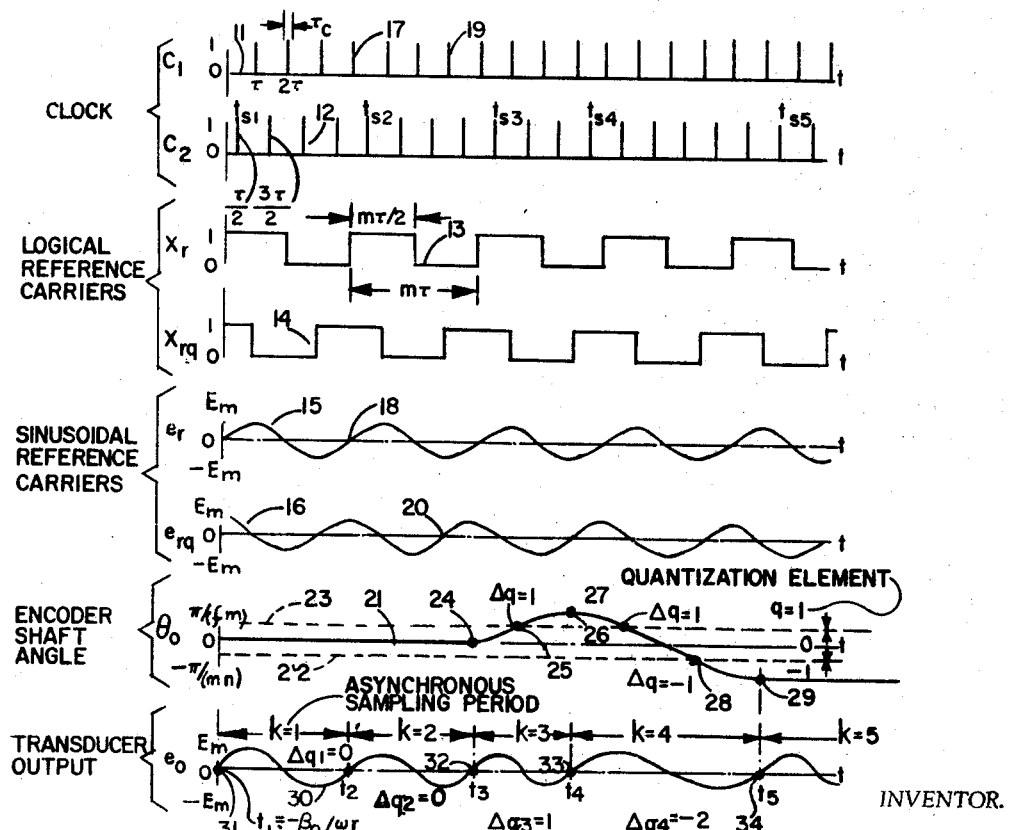
FIG. 2 illustrates various waveforms utilized by the position encoder system.

Referring to FIGS. 1 and 2, the basic components of the position encoder system are a two-phase clock 1, a digital two-phase carrier generator 2, a phase-shift transducer 4, and the components of the digital phase demodulator 3. The digital phase demodulator 3 includes a zero-crossing detector 5, a counter selector 6, two period counters 7 and 8 and a motion detector 9.

The position encoder system has a single input, the mechanical shaft angle $\theta_0(t)$ to be measured. Counterclockwise rotation will be considered positive, clockwise rotation negative. The angular shaft velocity is assumed to be constrained by the relation $$|\dot{\theta}_0(t)| < \omega_r/n \qquad (1)$$

where the fixed reference-carrier frequency $\omega_r$ is to be defined later. An initial encoder-shaft position $$-\frac{\pi}{mn} \leq \theta_0(O) < \frac{\pi}{mn} \qquad (2)$$

will also be assumed. The positive integers $m$ and $n$, design parameters of the encoder, will be discussed further in the subsequent text.

Two output signals are provide, $\Delta\theta_0^+(t)$ and $\Delta\theta_0^-(t)$, from which the net variation of the shaft angle $\theta_0(t)$ since the esablishment of initial conditions at $t=0$ can be determined. Both $\Delta\theta_0^+(t)$ and $\Delta\theta_0^-(t)$ are normally false two-valued logical signals. If the encoder shaft is rotated only counterclockwise (or only clockwise), one pulse will be emitted at output $\Delta\theta_0^+(t)$ (or output $\Delta\theta_0^-(t)$) for each $\pm 2\pi/(mn)$ radian of motion.

The output signals $\Delta\theta_0^+(t)$ and $\Delta\theta_0^-(t)$ resulting from bidirectional shaft rotation are most easily considered in the steady state wherein the shaft velocity $$\dot{\theta}_0(t)=0 \qquad (3)$$

for an adequate period; no pulses will then be emitted at either $\Delta\theta_0^+(t)$ or $\Delta\theta_0^-(t)$ as long as Equation 3 remains valid. If after $t=0$ a total of $p^+(t)$ pulses has been emitted at the output $\Delta\theta_0^+(t)$, and a total of $p^-(t)$ pulses has been emitted at output $\Delta\theta_0^-(t)$, then the encoder shaft position at time $t$ is within the range $$\frac{2\pi}{mn}\left[p^+(t)-p^-(t)-\frac{1}{2}\right] \leq$$

$$\theta_0(t) < \frac{2\pi}{mn}\left[p^+(t)-p^-(t)+\frac{1}{2}\right] \qquad (4)$$

i.e., $$\theta_0(t)=\frac{2\pi}{mn}[p^+(t)-p^-(t) \pm \epsilon(t)] \qquad (5)$$

where the tolerance is $$\epsilon(t)=\tfrac{1}{2} \qquad (6)$$

in the steady state and the interval of uncertainty is closed only on the left. The shaft position $\theta_0$ at time $t$ can thus be determined within plus or minus one-half resolution-element width by multiplying the resolution-element width $2\pi(mn)$ by the net difference $p^+(t) - p^-(t)$ between the numbers of pulses emitted at the outputs $\Delta\theta_0^+(t)$ and $\Delta\theta_0^-(t)$. This characteristic constitutes the basic principle of operation of the encoder.

The above discussion can now be extended to include operation of the encoder when it is not in the steady state. Equation 5 then still applies, but the tolerance $\epsilon(t)$ will be somewhat larger than shown in Equation 6 because of the slight delay in response due to sampling within the encoder. It is significant, however, that Equation 6 once more applies as soon as the encoder again enters the steady state; thus no cumulative error develops.

In the following discussion the position encoder will be viewed externally as a complete system, the dynamic response of which is to be determined. Consequently, explanation of the physical significance of certain of the quantities relevant to internal operation of the encoder will be deferred for later consideration.

The encoder is essentially a sampled-data device. The $i$th synchronous sampling period ($i > 0$) starts at the sampling time $t_{si}$ defined by $$t_1 + \tau_e \leq t_{si} = (j + \frac{1}{2})\tau < t_1 + \tau + \tau_e \quad (7)$$

where $\tau$ is the clock period, $\tau_e$ is the minimum time interval for which an enabling input must have been true at the time of a trigger-pulse trailing edge to initiate flip-flop response to that trigger pulse, and $t_1$ is obtained by solving the equation $$\omega_r t_1 + n\theta_0(t_1) + \beta_0 = 2\pi(i-1) \quad (8)$$

where $\beta_0$ is a bias angle to be defined later. The left side of Equation 8 represents the argument of the sinusoidal carrier output of the phase-shifting transducer 4 used in the position encoder. Thus each positive-slope zero crossing of this phase-shifted carrier, delayed until a succeeding trailing edge of a clock pulse, initiates a new synchronous sampling period. Equation 7 is introduced to accommodate the effects of synchronization. In it $j$ is a non-negative integer chosen to satisfy the inequality shown there. The $i$th asynchronous and synchronous sampling periods extend over the respective intervals $$t_i \leq t < t_{i+1}) \quad (9)$$

and $$t_{si} \leq t < t_{s(i+1)} \quad (10)$$

Throughout the interval $$-\frac{\pi}{mn} \leq \theta_o(t) < 2\pi - \frac{\pi}{mn} \quad (11)$$

$\theta_0(t)$ is quantized into $mn$ equal resolution elements, each of width $2\pi/(mn)$ radian, by the encoder. The encoder. The center of the $q$th resolution elements thus lies at $$\theta_{oq} = \frac{2\pi q}{mn} \quad (12)$$

When $\theta_0(t)$ lies within the $q$th resolution element, $$q - \frac{1}{2} \leq \frac{mn\theta_o(t)}{2\pi} < q + \frac{1}{2} \quad (13)$$

i.e., $$\theta_o(t) = \frac{2\pi}{mn}\left[q(t) \pm \frac{1}{2}\right] \quad (14)$$

where the range of uncertainty is closed only on the left. The range over which the integer $q$ must vary to include all possible values of $\theta_0(t)$ is established by the application; in some cases $q$ must vary without limit. For cases where the range of $q$ exceeds $mn$ the shaft will be positioned between the same physical limits for values of $q$ which differ by an integral multiple of $mn$.

The encoder functions by measuring variation of the index $q(t)$ of the resolution element within which the output-shaft position $\theta_0(t)$ lies at time $t$ as defined by Equations 12 through 14. Let the variation of $q(t)$ during the $i$th asynchronous sampling period defined by Equation 9 be $\Delta q_i$. Then, (1) If $\Delta q_i > 0$, the first $\Delta q_i C_i(t)$ clock pulses *after* the $i$th synchronous sampling period defined by Equation 10 will be emitted at output $\Delta\theta_0^+(t)$.

(2) If $\Delta q_i < 0$, the last $-\Delta q_i C_i(t)$ clock pulses *during* the $i$th synchronous sampling period will be emitted at output $\Delta\theta_0^-(t)$.

(3) If $\Delta q_i = 0$, no pulses will be emitted at outputs $\Delta\theta_0^+(t)$ or $\Delta\theta_0^-(t)$ either immediately before or after the end of the $i$th synchronous sampling period.

Thus during synchronous sampling period $i$, the number of pulses emitted at output $\Delta\theta_0^+(t)$ is $$p_i^+ = \begin{cases} \Delta q_{i-1}, & \Delta q_{i-1} > 0, i \geq 2 \quad (15a) \\ 0, & i = 1 \text{ or } \Delta q_{i-1} \leq 0, i \geq 2, \quad (15b) \end{cases}$$

and the number emitted at output $\Delta\theta_0^-(t)$ is $$p_i^- = \begin{cases} -q_i, & \Delta q_i < 0, i \geq 1 \quad (16a) \\ 0, & \Delta q_i \geq 0, i \geq 1 \quad (16b) \end{cases}$$

where $$\Delta q_i = q(t_{i+1}) - q(t_i), \, i \geq 1. \quad (17)$$

Under dynamic conditions, it now also becomes possible to determine the encoder shaft angle $\theta_0(t)$ by observing the incremental outputs $\Delta\theta_0^+(t)$ and $\Delta\theta_0^-(t)$. To achieve this result, it is first noted that the index of the center angle $\theta_{oq}(t_k)$ of the resolution element within which $\theta_0$ lies at time $t_k$ defined by Equation 8 is $$q(t_k) = \sum_{i=1}^{k-1} \Delta q_i + q(t_1), \, k > 1 \quad (18)$$

where $\Delta q_i$ is defined by Equation 17. From Equations 2, 8, and 13, it follows that $$q(t_1) = 0 \quad (19)$$

In Equation 18 it is necessary to evaluate $y(t_k)$ from the observable quantities $p_i^+$ and $p_i^-$. This can be accomplished by substituting Equations 15 and 16 into Equation 18 to yield $$q(t_k) = \sum_{i=2}^{k} p_i^+ - \sum_{i=1}^{k-1} p_i^-, \, k > 1 \quad (20)$$

The two summations shown equal, respectively, the total number of pulses $p^+(t_{s(k+1)})$ emitted at output $\Delta\theta_0^+(t)$ before the synchronous sampling time $t_{s(k+1)}$ and the total number of pulses $p^-(t_{sk})$ emitted at output $\Delta\theta_0^-(t)$ before the synchronous sampling time $t_{sk}$. Thus $$q(t_k) = p^+(t_{s(k+1)}) - p^-(t_{sk}) \quad (21)$$

By substituting Equation 21 into Equation 14, it follows that $$\theta_o(t_k) = \frac{2\pi}{mn}\left[p^+(t_{s(k+1)}) - p^-(t_{sk}) \pm \frac{1}{2}\right] \quad (22)$$

where the interval of uncertainty is closed on the left only.

Equation 22 defines the dynamic response of the position encoder system in terms of the shaft angle $\theta_0$ at the time $t_k$ of any positive-slope zero crossing of the sinusoidal output $e_0(t)$ of the phase-shift transducer 4. It states that this shaft angle equals the product of the mechanical quantization width $2\pi/(mn)$ and the difference $p^+ - p^-$ between the total numbers of positive and negative incremental pulses emitted at outputs $\Delta\theta_0^+(t)$ and $\Delta\theta_0^-(t)$, respectively. The total $p^-$ is taken at the synchronous sampling time $t_{sk}$ following $t_k$; the total $p^+$ is taken at the synchronous sampling time $t_{s(k+1)}$ following the next positive-slope zero crossing of $e_0(t)$ at $t_{k+1}$. It is the quantizing element in which $\theta_0$ lies at $t_k$ that is established by Equation 22; thus $\theta_0(t_k)$ is defined within a tolerance of $\pm\frac{1}{2}$ quantizing width.

OPERATION OF COMPONENTS

Operation of the components of the position encoder system shown in FIG. 1 will now be described in detail. The discussion will begin with brief reference to the generalized logic eleements from which these components are synthesized.

Figure 3:
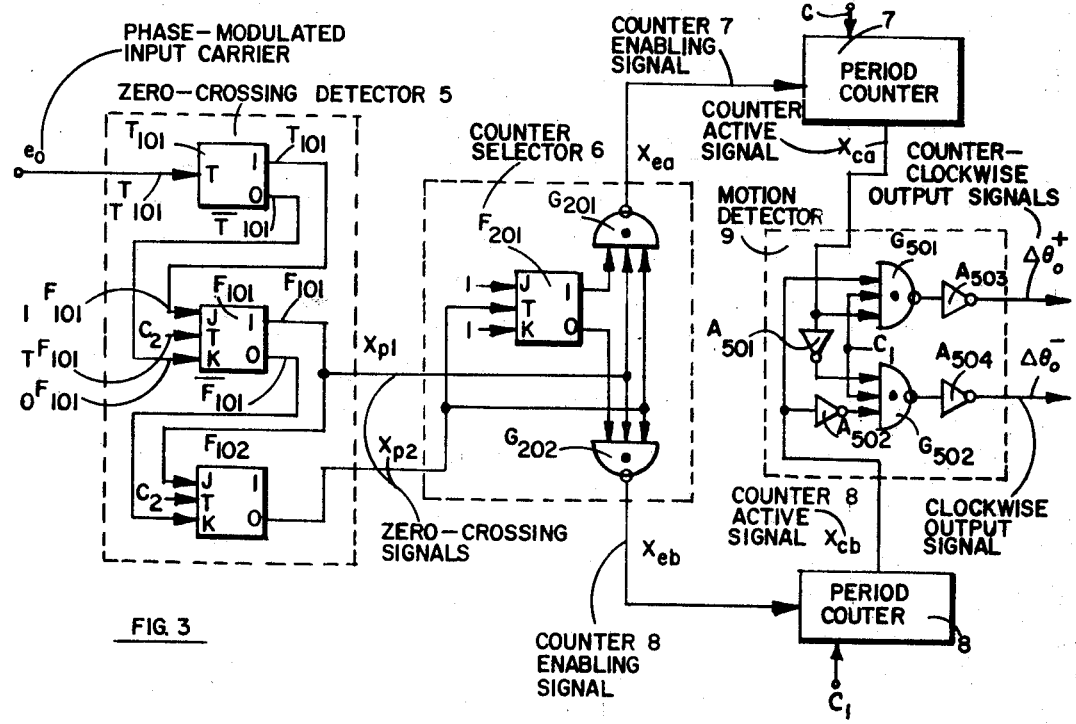
FIG. 3 is a logic diagram of a portion of the position encoder.

The trigger $T_{101}$ has an input and two outputs identified by the symbols shown with $T_{101}$ in FIG. 3. These symbols have the following significance:

$T^T{}_k$=analog input of trigger $T_k$,
$T_k$=normal logical output of trigger $T_k$,
$\overline{T}_k$=complement logical output of trigger $T_k$, where $k$ is assigned a positive integral value to designate a particular logic element.

The instantaneous value of each logical output just defined is the complement of the other. A trigger converts an analog input to a logical output in accordance with the equation $$T_k = \begin{cases} 1, & T^Tk \geq 0 \\ 0, & T^Tk < 0 \end{cases}$$

The preceding equation defines the instaneous *logical* value of the logical signal $T_k$. In general, the corresponding instantaneous *electrical* value of such a signal can exist only within one of two mutually exclusive ranges. One such electrical range is defined as corresponding to the logical value 1; the other electrical range is defined as corresponding to the logical value 0.

All flip-flops employed are of the JK type. (Ref.: Montgomery Phister, Jr., Logical Design of Digital Computers, pp. 128–129, 134–135.) Trailing-edge triggering whereby each flip-flop is responsive only to 1-to-0 transitions at the trigger input is used throughout. For clarity, the normally false clock signals $C_1(t)$ and $C_2(t)$ (FIG. 2) will be shown as idealized pulse trains in which the pulse length $\tau_c$ must be no shorter than the enabling time $\tau_e$ of the flip-flops employed.

Symbols associated with the inputs and outputs of a typical flip-flop are shown with $F_{101}$ in FIG. 3. These symbols are defined in the generalized form as follows:

$1^Fk$=set-enable input of flip-flop $F_k$,
$T^Fk$=trigger input of flip-flop $F_k$,
$0^Fk$=reset-enable input of flip-flop $F_k$,
$F_k$=normal output of flip-flop $F_k$,
$\overline{F}_k$=complement output of flip-flop $F_k$.

Each gate employed, for which the symbol $G_k$ is typical, is of the nand type. Such a gate produces a false output if, and only if, all inputs are true. A logical inverter functions much as a single-input nand-gate to produce a logical output which is the complement of its input; $A_k$ is a typical symbol for such an element. The output of either a nand-gate or a logical inverter is denoted by the same symbol as the logic element itself. In FIG. 3, $G_{201}$ and $A_{501}$ are typical examples of these two elements; a small circle is employed to indicate the function of producing the logical complement in both cases.

Except where otherwise stated, all transmission of information between components is by means of two-level logical electrical signals; one such level is assigned the logical value 1, the other the logical value 0.

TWO-PHASE CLOCK 1 AND DIGITAL TWO-PHASE CARRIER GENERATOR 2

Two sources of reference signals are employed in the position encoder system, a two-phase clock and a digital two-phase carrier generator (1 and 2, respectively, in FIG. 1).

The logical outputs $C_1(t)$ and $C_2(t)$ of the two-phase clock, each a pulse train of period $\tau$, are shown in FIG. 2. All waveforms will be shown only for $t>0$ and are in the steady state at $t=0$ unless otherwise stated. The first pulse of $C_1(t)$ shown is last true at $\tau$, the first pulse of $C_2(t)$ at $\tau/2$. Idealized pulses of length $\tau_c$ approaching zero are shown in both trains. Both clock signals are identical except for time displacement, i.e., $$C_2(t) = C_1(t+\tau/2) \qquad (23)$$

where $t$ is elapsed time. Each clock signal is normally false (i.e., normally has the logical value 0) and of low duty cycle. The clock-pulse length is typically $$\tau_c \leq \tau/4 \qquad (24)$$

during each such interval, a clock pulse remains continuously true.

The digital two-phase carrier generator 2 has as the only input the clock signal $C_1(t)$. This component generates two fixed-frequency sinusoidal carriers such that $C_1(t)$ and $C_2(t)$ pulses occur at the same angular positions within each cycle. Thereference and quadrature outputs are $$e_r(t) = E_m \sin(\omega t + \beta_0) \qquad (25)$$

and $$e_{rq}(t) = E_m \cos(\omega_r t + \beta_0) \qquad (26)$$

where $E_m$ is a constant of dimension volts, $$\omega_r = \frac{2\pi}{m\tau} \qquad (27)$$

and $$\beta_0 = \frac{2\pi\tau_e}{m\tau} \qquad (28)$$

Here the positive integer $m$ is the interpolation ratio of the encoder; it typically is an integral multiple of 4 equal to the number of internal states of the carrier generator and of each period counter 7 and 8. The bias $\beta_0$ is introduced to premit a mechanical resolution element to be centered at $\theta_0=0$. As Equation 28 shows, the bias required approaches zero when the ratio $\tau_e/\tau$ decreases sufficiently. A device which may be utilized to perform the functions of generator 2 is disclosed and claimed in applicant's co-pending U.S. patent application, Ser. No. 394,977, filed Sept. 8, 1964, entitled Digital Reference Source and assigned to North American Aviation, Inc., the assignee of this invention.

Theperiodic logical signals $X_r(t)$ and $X_{rq}(t)$ shown in FIG. 2, each of 50% duty cycle, are generated within the two-phase carrier generator 2. The period of each of these signals is $m\tau$, where the positive integer $m$ (typically a multiple of 4) equals the number of internal states of the carrier generator. In the example of the position encoder to be discussed, $m$ is set equal to 4 for simplicity. Each transition of $X_r(t)$ and of $X_{rq}(t)$ is initiated by a 1-to-0 transition of $C(t)$, the first 1-to-0 transition of $X_{rq}(t)$ for $t$ greater than 0 being initiated by the $C_2(t)$ trailing edge which occurs at $t=m\tau/4$. The two logical carrier signals are related by the equation $$X_{rq}(t) = X_r(t + m\tau/4) \qquad (29)$$

The electrical outputs of the digital two-phase carrier generator 2 are the sine and cosine waves $e_r(t)$ and $e_{rq}(t)$, each of angular frequency $\omega_r$. These signals are defined by Equations 25 and 26. They are the fundamental sinusoidal components of the logical reference carriers $X_r(t)$ and $X_{rq}(t)$, respectively, obtained by passing each of these logical signals through a separate bandpass filter. Each filter can be detuned slightly from $\omega_r$ to introduce a phase shift which permits Equations 25 and 26 to be satisfied exactly. Alternatively, each filter can be tuned to $\omega_r$ and the rotor of the phase-shift transducer displaced slightly on the shaft to obtain the same effect. It is significant that $C_1(t)$ pulses are generated having the same time relationships to each positive-slope zero-crossing of $e_r(t)$ and $e_{rq}(t)$. For example (Ref.: FIG. 2), the trailing edge of $C_1(t)$ at (17) lags the positive-slope zero crossing of $e_r(t)$ at (18) by $m\tau\beta_0/(2\pi)$, and the trailing edge of the $C_1(t)$ pulse at (19) lags the positive-slope zero crossing of $e_{rq}(t)$ at (20) by the same amount.

PHASE-SHIFT TRANSDUCER

The phase-shift transducer 4 of speed $n$ has as inputs the shaft angle $\theta_0(t)$ to be measured and the two-phase sinusoidal carriers $e_r(t)$ and $e_{rq}(t)$ defined by Equations 25 and 26. It shifts the instantaneous phase of $e_r(t)$ by an amount which is a linear function of the shaft angle $\theta_o(t)$. The resultant phase-modulated output is $$e_o(t) = E_m \sin[\omega_r t + \phi_o(t)] \quad (30)$$

where $$\phi_o(t) = n\theta_o(t) + \beta_o \quad (31)$$

Several types of transducers are suitable for use as component 4 to vary the phase $\phi_o(t)$ of the sinusoidal reference carrier $e_r(t)$ as a linear function of the shaft angle $\theta_a(t)$ in accordance with Equation 31. The speed $$n = \frac{d\phi_o}{d\theta_o} \quad (32)$$

or the transducer employed is typically an integer equal to or greater than 1, a higher speed yielding finer mechanical resolution with a given phase demodulator 3.

A suitably excited resolver can be used as the phase-shift transducer 14. Utilization of a resolver is based upon the trigonometric identity for the sine of the sum of two angles $x$ and $y$, viz, $$\sin(x+y) = \cos y \sin x + \sin y \cos x \quad (33)$$

If the definitions $$x = \omega_r t + \beta_o \quad (34)$$

and $$y = n\theta_o(t) \quad (35)$$

are made, if Equations 34 and 35 are substituted into Equation 33, and if the result is multiplied by $E_m$, it follows that $$E_m \sin[\omega_r t + n\theta_o(t) + \beta_o] = e_{o1}(t) + e_{o2}(t) = e_o(t) \quad (36)$$

in accordance with Equation 30 where $$e_{o1}(t) = E_m \cos n\theta_o(t) \sin(\omega_r t + \beta_o) \quad (37)$$

and $$e_{o2}(t) = E_m \sin n\theta_o(t) \cos(\omega_r t + \beta_o) \quad (38)$$

Equations 37 and 38 can be mechanized by attaching an $n$-speed resolver having rotor-angle sine and cosine channels to the rotating member of which the position $\theta_o(t)$ is to be measured. A resolver having unity maximum gain in each channel will be assumed. If the rotor-angle cosine channel of the resolver is now excited by $e_r(t)$ and the sine channel is excited by $e_{rq}(t)$ as defined by Equations 25 and 26, the respective voltages shown in Equations 37 and 38 result. These voltages can be added by conventional means to obtain the required output voltage $e_o(t)$ in Equation 36. (R. K. Richards, Digital Computer Components and Circuits, pp. 483–485 and FIGURES 11–6c. Addition with an operational amplifier as described in this reference inverts the polarity of the sum. Consequently, to satisfy Equation 36 by this means requires an expedient such as reversing the polarities of $e_r(t)$ and $e_{rq}(t)$, changing the signs of the transfer functions of the resolver channels, or placing an inverting amplifier in cascade with the adder.)

The phase-shift transducer input $\theta_o(t)$ shown in FIG. 2 at 21 will be used to illustrate operation of the position encoder. Shown with $\theta_o(t)$ are the interfaces between quantization elements $-1$ and 0 at 22 and between quantization elements 0 and 1 at 23. The encoder shaft angle $\theta_o(t)$ is 0 for $t \leq 0$ and remains 0 until it starts to increase at 24. At 25 $\theta_o(t)$ moves between quantization elements 0 and 1 to reach a maximum value of $\pi/(2n)$ radians at 26. The shaft angle then decreases to pass between quantization elements 1 and 0 at 27 and 0 and $-1$ at 28. Finally, at 29 $\theta_o(t)$ reaches a steady-state value of $-\pi/(2n)$ radians.

The corresponding phase-shifted carrier output $e_o(t)$ of the phase-shift transducer 4, as defined by Equation 30 appears at 30. In accordance with Equation 8, with $i=1$ and $\theta_o(t_1)=0$, the first positive-slope zero crossing shown, which appears at 31, occurs at $$t_1 = -\beta_o/\omega_r \quad (39)$$

The instantaneous angular frequency of $e_o(t)$ remains of constant value $\omega_r$ until 32. It is greater than $\omega_r$ between 32 and 33 because of the positive slope of $\theta_o(t)$ within that interval and less than $\omega_r$ between 33 and 34 due to due to the corresponding negative slope of $\theta_o(t)$. With waveform is shown the time $t_k$ of each positive-slope zero crossing initiating an asynchronous sampling period, the boundaries of each asynchronous sampling period, and the net total of quantization-element interfaces $\Delta q_k$ crossed during each asynchronous sampling period. Each corresponding time $t_{sk}$ at which a $C_2(t)$ trailing edge initiates a synchronous sampling period is shown with the waveform of $C_2(t)$. The manner in which the phase demodulator 3 responds to the $e_o(t)$ waveform shown will be discussed in the following text.

DIGITAL PHASE DEMODULATOR

The digital phase demodulator 3 receives as inputs the phase-modulated sinusoidal carrier $e_o(t)$ of phase $\phi_o(t)$ defined by Equation 31, along with the clock signals $C_1(t)$ and $C_2(t)$. This component is a sampled-data device which quantizes the phase angle $\phi_o(t)$ with a quantizing width $2\pi \& m$ electrical radians and, consequently, quantizes the shaft angle $\theta_o(t)$ with a quantizing width $2\pi/(mn)$ mechanical radians. The $i$th synchronous sampling period begins at the time $t_{si}$ when the first $C_2(t)$ pulse terminating at least an interval $\tau_e$ after the time $t_i$ of the $i$th positive-slope zero crossing of $e_o(t)$ is last true; $t_{si}$ is identified by a zero-crossing detector 5 which is responsive only when $\dot{e}_o(t) > 0$. If the phase demodulator should respond to a too-fully truncated $C_2(t)$ pulse when the phase angle $\phi_o(t)$ is marginal, a design feature of the demodulator prevents any permanent output error from developing; any uncertainty due to truncation in one sampling period is automatically compensated in the following sampling periods.

Two incremental output signals are generated by the phase demodulator, $\Delta\theta_o^+(t)$ and $\Delta\theta_o^+(t)$. To define these signals, let the shaft and phase angles $\theta_o(t)$ and $\phi_o(t)$ lie within resolution element $q(t_i)$ at time $t_i$ and within resolution element $q(t_{i+1})$ at time $t_{i+1}$. If the shaft angle $\theta_o(t)$ moves to a more counterclockwise resolution element during the asynchronous sampling period $i$ extending from $t_i$ to $t_{i+1}$, the first $q(t_{i+1}) - q(t_i)$ pulses of $C_1(t)$ during synchronous sampling period $i+1$ are emitted at the output $\Delta\theta_o^+(t)$. Similarly, if $\theta_o(t)$ moves to a more clockwise resolution element during the period from $t_i$ to $t_{i+1}$, the last $q(t_i) - q(t_{i+1})$ pulses of $C_1(t)$ during synchonous sampling period $i$ are emitted at the output $\Delta\theta_o^-(t)$. Such operation is in accordance with Equations 15a, b and 16a, b.

The digital phase demodulator determines phase variation by measuring equivalent time displacement. The necessary relationship between phase and time can be established by first noting from Equation 39 that $$\theta_o(t_i) = [2\pi(i-1) - \beta_o - \omega_r t_i]/n \quad (40)$$

If $\theta_o(t_i)$ lies within the resolution element $q(t_i)$, then $$q(t_i) - \frac{1}{2} \leq \frac{mn\theta_o(t_i)}{2} < q(t_i) - \frac{1}{2} \quad (41)$$

By substituting the value of $\theta_o(t_i)$ from Equation 40 into Relation 41 and employing solutions for $\omega_r$ and $\beta_o$ from Equations 36 and 39, appropriate manipulation yields $$(j - \tau_e/\tau - \frac{1}{2})\tau < t_i \leq (j - \tau_e/\tau + \frac{1}{2})\tau \quad (42)$$

where the integer $j$ is defined as $$j = m(i-1) - q(t_i) \quad (43)$$

Since $t_{si}$ can be defined as the time when a $C_2(t)$ pulse is last true at least an interval $\tau_e$ after $t_i$, it follows from Relations 42 and 43 that $$t_{si} = (j + \frac{1}{2})\tau = [m(i-1) - q(t_i) + \frac{1}{2}]\tau \quad (44)$$

Through solution for $q(t_i)$, successive substitution of the values $k$ and $k+1$ for $i$, and subtracting, there results $$\Delta q_k = q(t_{k+1}) - q(t_k) = [(t_{sk} + m\tau) - t_{s(k+1)}]/\tau \quad (45)$$

This equation states that the absolute value of $\Delta q_k$ equals the number of successive periods of duration $\tau$ between the times $t_{sk} + m\tau$ and $t_{sk'} + m\tau$. The sign of $\Delta q_k$ is positive if $t_{s(k+1)}$ occurs before $t_{sk} + m\tau$ and negative if the converse situation exists.

Equation 45 is mechanized in the digital phase demodulator. The contents of one of the $m$-state cyclic period counters 7 or 8 are set to 1 by the first $C_1(t)$ pulse after each time $t_{sk}$. Thereafter that counter continues to count $C_1(t)$ pulses, recycling to 0 at the time $$t_{gk} = t_{sk} + (m - \tfrac{1}{2})\tau \quad (46)$$

It follows that the number of $C_1(t)$ pulses between $t_{gk}$ and $t_{s(k+1)}$ equals $\Delta q_k$. A motion detector 9 directs all of these selected $C_1(t)$ pulses to the output $\Delta\theta_o^+(t)$ if $t_{s(k+1)} < t_{gk}$ or to the output $\Delta\theta_o^-(t)$ if $t_{gk} < t_{s(k+1)}$.

The two identical period counters 7 and 8 employed in the demodulator are started alternately by a counter selector 6. This arrangement is necessary because counterclockwise shaft rotation, which causes both $\theta_o(t)$ and $\phi_o(t)$ to increase, can result in the condition $$t_{s(k+1)} + \tau/2 \leq t_{gk} \quad (47)$$

Relation (47) requires period count $k+1$ to begin before period count $k$ is complete and the counter involved has recycled to 0 for the necessary interval $\tau$. This requirement is met by the alternate use of two period counters.

ZERO-CROSSING DETECTOR 5

The zero-crossing detector 5 receives as inputs the phase-modulated sinusoidal transducer output $e_o(t)$ and the clock signal $C_2(t)$. This component converts the asynchronous signal $e_o(t)$ into the logical output signals $X_{p1}(t)$ and $X_{p2}(t)$ with transitions synchronized to trailing edges (i.e., 1-to-0 jumps) of $C_2(t)$, thereby permitting fully synchronous operation of the remainder of the phase demodulator. The positive-slope zero-crossing signals $X_{p1}(t)$ and $X_{p2}(t)$ initiate counting by one of the period counters 7 or 8 by assuming the state $$X_{p1} X_{p2} = 1 \quad (48)$$

for a single clock period $\tau$ beginning at times $t_i (i > 0)$, i.e., with the first 1-to-0 transition of $C_2(t)$ occurring more than an interval $\tau_e$ after each zero crossing of $e_o(t)$ for which $\dot{e}_o(t) > 0$.

As shown in FIG. 3, the trigger $T_{101}$ is connected to go true (i.e., to assume the output state $T_{101}(t) = 1$) whenever $e_o(t) \geq 0$ but to remain false otherwise. Flip-flop $F_{101}$ assumes the same logical state as $T_{101}$ in response to the first 1-to-0 transition of clock signal $C_2(t)$ to occur at least an enabling interval $\tau_e$ after $T_{101}$ changes state. One clock period $\tau$ later, the state of $F_{102}$ becomes the same as that of $F_{101}$. The normal output of flip-flop $F_{101}$ is the zero-crossing detector output $X_{p1}(t)$; the complement output of flip-flop $F_{102}$ is the detector output $X_{p2}(t)$.

The logic equations governing operation of the zero-crossing detector 5 are listed below:

$T^T 101 = e_o,$ } Trigger $T_{101}$ input equation $\left.\begin{array}{l} 1^F 101 = T_{101}, \\ T^F 101 = C_2, \\ 0^F = 101 = \overline{T}_{101}, \end{array}\right\}$ Flip-flop $F_{101}$ input equations $\left.\begin{array}{l} 1^F 102 = F_{101}, \\ T^F 102 = C_2, \\ 0^F 102 = \overline{F}_{101}, \end{array}\right\}$ Flip-flop $F_{102}$ input equations $\left.\begin{array}{l} X_{p1} = F_{101}, \\ X_{p2} = \overline{F}_{102}. \end{array}\right\}$ Output equations.

Figure 5:
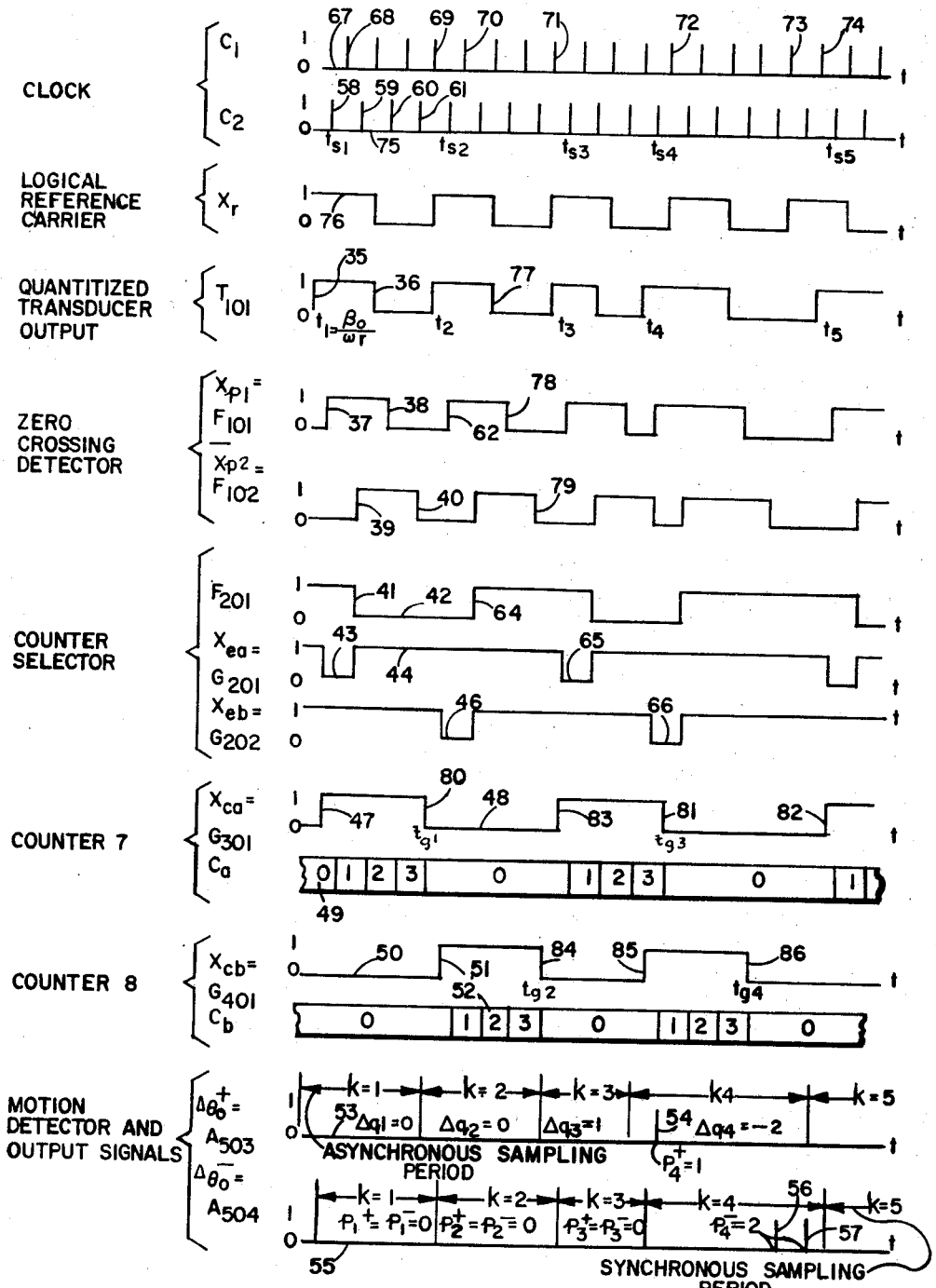
FIG. 5 illustrates various wave forms related to the position encoder system.

Waveforms relating to all components of the digital phase demodulator 3 appear in FIG. 5. Waveforms are shown only for $t > 0$ except where otherwise stated. These waveforms show the response of the phase demodulator to the specific phase-shift transducer output signal $e_o(t)$ shown in FIG. 2 at 30. For reference, the signals $C_1(t)$, $C_2(t)$, and $X_r(t)$ which appear at 11, 12, and 13 in FIG. 2 are also shown at 67, 75, and 76, respectively, in FIG. 5. As before, the time $t_{sk}(k \geq 1)$ at which each synchronous sampling period begins is shown with $C_2(t)$ at 12.

Since $T_{101}(t) = 1$ whenever the phase shift transducer output $e_o(t) \geq 0$, $T_{101}(t)$ goes through a 0-to-1 transition at the start $t_k$ of each synchronous sampling period. This signal controls the response of flip-flop $F_{101}$ at 78 to $C_2(t)$ pulses. The signal $F_{101}(t)$, in turn, controls the response of flip-flop $F_{102}$ at 79 to $C_2(t)$ pulses.

When $T_{101}(t)$ goes true at 35, $F_{101}$ responds to the 1-to-0 transition of $C_2(t)$ at 58 by assuming the same true state at 37. One clock period $\tau$ later, the $C_2(t)$ trailing edge at 59 causes the true state of flip-flop $F_{101}$ to shift to $F_{102}$ at 39.

At 36, $T_{101}(t)$ goes false when $e_o(t)$ becomes negative. As before, at the next $C_2(t)$ trailing edge 60 at least $\tau_e$ later, the logical state of trigger $T_{101}$ shifts to flip-flop $F_{101}$ at 38. Similarly, at the next $C_2(t)$ trailing edge 61 the false state of $F_{101}$ shifts to $F_{102}$ at 40.

The above cycle repeats on each positive- and negative-slope zero crossing of $e_o(t)$. In a typical cycle, a significant interval is between adjacent 0-to-1 transitions of $F_{101}(t)$ and $F_{102}(t)$, as at 37 and 39, respectively. During such an interval both outputs $X_{p1}(t) = F_{101}(t)$ and $X_{p2}(t) = \overline{F}_{102}(t)$ are true, satisfying Equation 48. This state of the outputs of the zero-crossing detector 5 identifies the time of occurrence of each positive-slope zero crossing of $e_o(t)$ for other components of the phase demodulator 3.

COUNTER SELECTOR 6

The counter selector 6 receives signal inputs $X_{p1}(t)$ and $X_{p2}(t)$ from the zero-crossing detector 5. Whenever these inputs are simultaneously true, the counter selector generates a false pulse alternately at one or the other of the two outputs $X_{ea}(t)$ or $X_{eb}(t)$. Both outputs are normally true.

As shown in FIG. 3, the inputs of the nand-gates $G_{201}$ and $G_{202}$ are connected to $X_{p1}(t)$, to $X_{p2}(t)$, and to $F_{201}(t)$ or $\overline{F}_{201}(t)$. Each gate generates a false output when, and only when, $X_{p1}(t)$ and $X_{p2}(t)$ are simultaneously true, and the gate is enabled by the output of $F_{201}$ to which it is connected. The flip-flop $F_{201}$ is connected to toggle on each 1-to-0 transition of $X_{p2}(t)$. Thus each nand-gate is disabled as soon as it emits a false pulse and remains so until a false pulse has been emitted by the other nand-gate; consequently, these nand-gates generate false output pulses alternately. As FIG. 3 indicates, the outputs of the gates $G_{201}$ and $G_{202}$ constitute the outputs $X_{ea}(t)$ and $X_{eb}(t)$, respectively, of the counter selector 6.

The logic equations governing operation of the counter selector 6 appear below:

$\left.\begin{array}{l} 1^F 201 = 1, \\ T^F 201 = X_{p2}, \\ 0^F 201 = 1, \end{array}\right\}$ Flip-flop $F_{201}$ input equations $\left.\begin{array}{l} X_{ea} = G_{201} = \overline{F_{201} X_{p1} X_{p2}} \\ X_{eb} = G_{202} = \overline{\overline{F}_{201} X_{p1} X_{p2}} \end{array}\right\}$ Gate and output equations.

Logical waveforms relating to the counter selector are shown in FIG. 5. The flip-flop output $F_{201}(t)$, which determines the counter to be enabled, appears at 42. In typical instances, $X_{p1}(t)$ and $X_{p2}(t)$ are simultaneously true in consecutive intervals from 37 to 39 and from 62 to 63. For the duration of each such interval, a false output pulse is generated at either of the normally true outputs $X_{ea}(t)$ or $X_{eb}(t)$, as at 44 and 45, respectively; at which output a false pulse is to be generated is determined by the state of the flip-flop $F_{201}$.

Flip-flop $F_{201}$ toggles in response to each 0-to-1 transition of the signal $F_{102}(t)$. For example, the $F_{102}(t)$ transition at 39 causes flip-flop $F_{201}$ to toggle to the false state at 41; the following 0-to-1 transition of $F_{102}(t)$ at 63 then causes flip-flop $F_{201}$ to again toggle to the true state at 64. This sequence is continuous.

Since the signal $F_{201}(t)$ is true during the first interval shown in which $X_{p1}(t)X_{p2}(t)=1$, i.e., from 37 to 59, a false pulse 43 is emitted at $X_{ea}(t)$ (note that $\overline{X}_{n2}$ is illustrated in FIG. 5 and that $X_{p2}$ would have the complementary levels, therefore, during the period from time $t=0$ to period 39, $X_{p2}$ would be at the 1 level); conversely, the false state of $F_{201}(t)$ during the second such interval from 62 to 63 causes a false pulse 46 to be emitted at $X_{eb1}t$). False pulses continue to be emitted alternately at $X_{ea}(t)$ and $X_{eb}(t)$ as shown at 65 and 66.

PERIOD COUNTERS 7 AND 8

The input and output connections to the two period counters 7 and 8 are shown by the logic diagram in FIG. 3. Period counter 7 starts to count $C_1(t)$ pulses when the normally true input $X_{ea}(t)$ goes false for an interval including one $C_1(t)$ pulse. The normally false output $X_{ca}(t)$ of this counter goes true as soon as $X_{ea}(t)$ goes false and remains true for a period $(m-1)\tau$ after the trailing edge of the $C_1(t)$ pulse cited, where the integer $m$ is the number of internal states of the counter.

The number $m$ of internal states of each period counter must equal the number of $C_1(t)$ pulses occurring during each cycle of the reference carrier $e_r(t)$. Because a $C_1(t)$ pulse must trigger each zero crossing of both the reference and quadrature carriers $e_r(t)$ and $e_{rq}(t)$, $m$ must be an integral multiple of 4. Conventional procedures are available for designing an $m$-state counter to meet these requirements. (Ref.: Montgomery Phister, Jr., Logical Design of Digital Computers, pp. 117–121.)

Since the total number of resolution elements per shaft revolution (i.e., per $2\pi$ mechanical radians) is $mn$, where $n$ is the speed of the phase-shift transducer 4 employed, considerable versatility can be attained through appropriate counter design to provide a resolution-element width equal to a standard angular measurement unit in applications where this feature is required. Some values of $mn$ necessary to obtain standard resolution-element widths are shown in Table 1, along with corresponding prime factors; each value of $mn$ shown is divisible by 4. Selection of a transducer-and-counter combination to obtain a given standard resolution-element width requires that all of the prime factors shown for that resolution be apportioned to two products, one equal to the transducer speed $n$, and the other equal to the number of period-counter states $m$. A variety of apportionments can be made as long as the resultant value of $m$ is an integral multiple of 4. Even in the case of the widest resolution element shown, a variety of values of the transducer speed $n$ can be accommodated: 1, 2, 3, 5, 6, 9, 10, 15, 18, 30, 45, and 90. As the value of $mn$ increases in Table 1, the number of possible combinations of $m$ and $n$ also becomes larger.

TABLE 1.—STANDARD RESOLUTION ELEMENTS PER REVOLUTION

| Resolution-Element Width | Resolution Elements per Revolution, $mn$ | Prime Factors of $mn$ |
| --- | --- | --- |
| 1.00 degree | 360 | $2^3 \cdot 3^2 \cdot 5$ |
| 0.10 degree | 3,690 | $2^4 \cdot 3^2 \cdot 5^2$ |
| 1.00 mil | 6,400 | $2^8 \cdot 5^2$ |
| 1.00 arc minute | 21,600 | $2^5 \cdot 3^3 \cdot 5^2$ |
| 0.01 degree | 36,000 | $2^5 \cdot 3^2 \cdot 5^3$ |
| 0.10 arc minute | 216,000 | $2^6 \cdot 3^3 \cdot 5^3$ |
| 1.00 arc second | 1,296,000 | $2^7 \cdot 3^4 \cdot 5^3$ |

Cyclic counters with $2\pi$ states, where the integer $j>1$, are generally more efficient than other counters in terms of internal states per logic element. Although the number of transducer speeds which can be used to yield a standard resolution-element width is reduced by employing such a counter, where either this condition or a non-standard resolution-element width is acceptable, this type of counter can be employed. The design of a counter in which the number of internal states is $$m=2^j,\ j>1 \qquad (49)$$

for an arbitrary number of stages $j$ will be described in the following text. The value $j=2$ will then be assigned to obtain a value of $m$ corresponding to the number of $C_1(t)$ pulses shown per cycle of $e_o(t)$ in FIG. 2.

Figure 4:
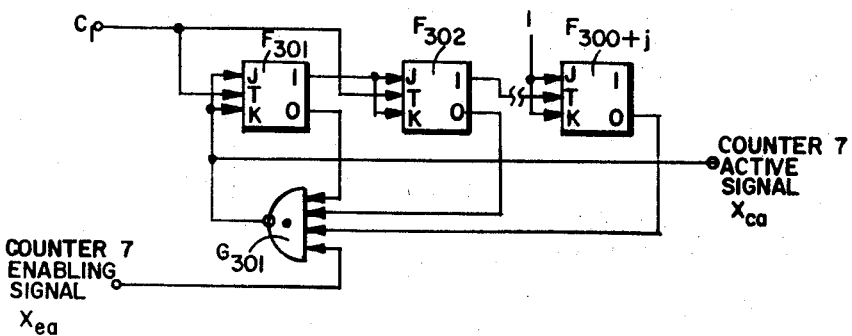
FIG. 4 is a logic diagram of another portion of the position encoder.

The logic diagram of period counter 7 and/or 8 is shown in FIG. 4, both counters being identical in construction and operation. Period counter 7 is a $j$-stage straight-binary counter with contents defined by the equation $$C_a(t)=\sum_{i=0}^{j-1} F_{301+i}(t)2^i \qquad (50)$$

which, once enabled, counts $C_1(t)$ pulses and recycles to $C_a(t)=0$ in response to the next $C_1(t)$ pulse upon reaching saturation. Similarly, the contents of period counter 8 are $$C_b(t)=\sum_{i=0}^{j-1} F_{401+i}(t)2^i \qquad (51)$$

The basic unit of the counters 7 and 8 shown in FIG. 4 is the flip-flop doublet typified by $F_{301}$ and $F_{3u2}$. The output of such a doublet is the normal output of the highest-order flip-flop, in this case $F_{302}$. The first doublet is triggered by $C_1(t)$; each other doublet is triggered by the output of the preceding doublet. Both enabling inputs of the lowest-order flip-flop of the first doublet are driven by the nand-gate $G_{301}$; the enabling inputs of the lowest-order flip-flop of each remaining doublet are permanently connected to a signal having the fixed logical value 1. Obviously, only a counter with an even number of stages can be synthesized entirely of flip-flop doublets. If an odd number of stages is required, a single stage such as $F_{300+j}$ in FIG. 4 is added at the output. Counters composed of flip-flop doublets require no more logic elements than a conventional ripple counter of the same capacity, yet have only approximately half the settling time.

Operation of the period counter 7 is controlled by the gate $G_{301}$. This nand-gate has as inputs both the normally true enabling signal $X_{ca}(t)$ and the complement output of each flip-flop in the counter. The output of gate $G_{301}$ constitutes both the period-counter output $X_{ca}(t)$ and the enabling inputs for flip-flop $F_{301}$. Thus when $X_{ca}(t)=1$ for a single period of $C_2(t)$, the counter is enabled by the signal $G_{301}(t)=1$ and continues to count $C_1(t)$ pulses cyclically until $C_a(t)$ returns to 0. The counter then remains in this state until $X_{ea}(t)$ again goes false for a single $C_1(t)$ pulse. The cycle described repeats continuously.

The logic equations governing operation of period counter 7 when two counting stages are employed appear below:

$$\left.\begin{array}{l}1^F301=G_{301},\\ T^F301=C_1,\\ O^F301=G_{301},\end{array}\right\} \text{Flip-flop } F_{301} \text{ input equations}$$

$$\left.\begin{array}{l}1^F302=F_{301},\\ T^F302=C_1,\end{array}\right\} \text{Flip-flop } F_{302} \text{ input equations}$$

$$\left.\begin{array}{l}0^F_{302}=F_{301},\\ X_{ca}=G_{301}=\overline{F}_{301}\overline{F}_{302}X_{ea}.\end{array}\right\} \text{Gate and output equation}$$

Period counter 8 is identical to period counter 7; in the logic diagram and logic equations, however, $X_{eb}(t)$ replaces $X_{ea}(t)$, $X_{cb}(t)$ replaces $X_{ca}(t)$, and 100 is added to the index of every logic element employed. Thus the logic equations governing operation of period counter 8 when two counting stages are employed are as shown below:

$$1^F 401 = G_{401},$$
$$T_F 401 = C_1,$$
$$0^F 401 = \overline{G_{401}},$$
Flip-flop $F_{401}$ input equations $$1^F 402 = F_{401},$$
$$T^F 402 = C_1,$$
$$0^F 402 = \overline{F_{401}},$$
Flip-flop $F_{402}$ input equations $$X_{cb} = G_{401} = \overline{F}_{401} \overline{F}_{402} X_{eb}\}.$$ Gate and output equations.

Logic equations for period counters having a larger number of stages can also be written on the basis of the preceding design principles.

The logical waveforms and states of both period counters are shown in FIG. 5. As shown at 48, the normally false output $X_{ca}(t)$ of period counter 7 responds to the $X_{ea}(t)$ pulse at 43 by going true at 47. At 49, the contents $C_a(t)$ of period counter 7, initially 0, start to increase as $C_1(t)$ pulses, are counted. The counter-active signal $X_{ca}(t)$ remains true until, in response to the $C_1(t)$ pulse at 69, the contents $C_a(t)$ recycle to 0 and $X_{ca}(t)$ again goes false at 80. This cycle is repeated in response to the $X_{ea}(t)$ pulse at 65 and to those which succeed it.

As shown at 50, the normally false output $X_{cb}(t)$ of period counter 8 is similar to $X_{ca}(t)$ but responds to $X_{eb}(t)$ at 64. The $X_{eb}(t)$ pulse at 46 causes $X_{cb}(t)$ to go true at 51, thereby causing the contents $C_b(t)$ of counter 8 shown at 52 to increment in response to the $C_1(t)$ pulses from 70 to 71. When the $C_1(t)$ pulse at 71 causes period counter 8 to recycle to $C_b(t)=0$, $X_{cb}(t)$ again goes false at 84. This cycle is repeated in response to the $X_{eb}(t)$ pulse at 66 and to those which succeed it.

The time $t_{gk}$ at which each counting cycle ends is identified adjacent to the presentations of the instantaneous contents of period counters 7 and 8 at 49 and 52. This function is defined by Equation 46.

MOTION DETECTOR 9

The logic diagram of the motion detector 9 is the final one to appear in FIG. 3. This component receives the signals $X_{ca}(t)$ and $X_{cb}(t)$ from period counters 7 and 8, respectively. In functioning, it emits every $C_1(t)$ pulse which occurs when $X_{ca}(t)$ and $X_{cb}(t)$ are simultaneously true at the output $\Delta\theta_o^+(t)$ and emits every $C_1(t)$ pulse which occurs when $X_{ca}(t)$ and $X_{cb}(t)$ are simultaneously false at the output $\Delta\theta_o^-(t)$.

As shown in FIG. 3, the motion detector 9 utilizes the two nand-gates $G_{501}$ and $G_{502}$ with associated logical inverters to provide the required response. The logic equations governing operation of the motion detector follow:

$$G_{501} = \overline{C_1 X_{ca} X_{cb}},$$
$$G_{502} = \overline{C_1 \overline{X}_{ca} \overline{X}_{cb}},$$
Gate equations $$A_{501} = \overline{X}_{ca},$$
$$A_{502} = \overline{X}_{cb},$$
Inverter equations $$\Delta\theta_o^+ = A_{503} = \overline{G}_{501},$$
$$\Delta\theta_o^- = A_{504} = \overline{G}_{502},$$
Output and inverter equations.

Waveforms of the normally false output signals $\Delta\theta_o^+(t)$ and $\Delta\theta_o^-(t)$ of the motion detector appear at 53 and 55 in FIG. 5. Although $X_{ca}(t) = X_{cb}(t) = 0$ from 80 to 51 and from 84 to 83, a pulse output is not emitted at $\Delta\theta_o^-(t)$ because no $C_1(t)$ pulse occurs in either of these intervals. From 85 to 81, $X_{ca}(t) = X_{cb}(t) = 1$; in this interval a single $C_1(t)$ pulse 72 occurs and is emitted at output $\Delta\theta_o^+(t)$ as shown at 54. Finally, $X_{ca}(t) = X_{cb}(t) = 0$ in the interval from 86 to 82, during which two $C_1(t)$ pulses occur at 73 and 74. Both of these pulses are emitted at output $\Delta\theta_o^-(t)$ as shown at 56 and 57.

As a final summary to the operation of the position encoder system, the intervals of five contiguous asynchronous sampling periods, each initiated at a time $t_k$ ($1 \leq k \leq 5$), have been transferred from 30 in FIG. 2 to appear with $\Delta\theta_o^+(t)$ at 53 in FIG. 5. The net total $\Delta_{qk}$ of the quantization-element interfaces crossed by the shaft angle $\theta_o(t)$ during each such sampling period is also shown. Similarly, the intervals of the corresponding five synchronous sampling periods, each initiated at a a time $t_{sk}$ ($1 \leq k \leq 5$) shown at 12 in FIG. 2, appear with output $\Delta\theta_o^-(t)$ at 55. The total numbers $p_k^+$ and $p_k^-$ of $C_1(t)$ pulses emitted at outputs $\Delta\theta_o^+(t)$ and $\Delta\theta_o^-(t)$, respectively, during each synchronous sampling period are also shown at 55. In every case, $\Delta_{qk}$, $p_k^+$, and $p_{k-}$ are related as predicted by Equations 15a, b and 16a, b.

Although the invention has been illustrated and described in detail, it is to be clearly understood that the same is by way of illustration and example only and is not to be taken by way of limitation, the spirit and scope of this invention being limited only by the terms of the appended claims.

I claim:
1. A position encoder comprising in combination:
   a crossing detector having as an input a zero-crossing phase-modulated signal, modulated as a function of input position, said detector responsive to said zero crossings of said signal providing two output signals having true and false levels at times dependent upon said modulated signal;
   a counter selector having two normally true level output signals responsive to simultaneous true level signals from said crossing detector for alternately changing to a false level said output signals;
   a source of clock pulses;
   a first and second counter each having a normally false-level output signal and each being responsive to one of said counter-selector false-level output signals for providing a true-level signal indicative of a predetermined number of counted clock pulses; and
   a motion detector responsive to said first and second counters providing pulses from a specified set of pulses from said clock source at a first output terminal when the signals from said counters are simultaneously true and for providing pulses from said clock source at a second output terminal when the signals from said counters are simultaneously false.

2. A position encoder comprising in combination:
   means providing periodic clock pulses;
   a reference signal generator providing a periodic reference signal as a function of said clock pulses;
   means phase modulating said reference signal as a function of position;
   means detecting the crossing of a predetermined level by said modulated signal providing a first and second outlet signal at the time of said crossings;
   selector means responsive to said first and second output signals alternately providing as a function of one of said output signals a first and second enabling signal;
   a first counter having a normally first level output signal responsive to said first enabling signal to provide a second level output signal indicative of a number of counted clock pulses less than a predetermined number;
   a second counter having a normally first level output signal responsive to said first enabling signal to provide a second level output signal indicative of a number of counted clock pulses less than a predetermined number; and
   motion detector means responsive to said counters for providing a clock pulse at a first output when the output signals from said counters are simultaneously at said first level and for providing a clock pulse at a second output when the output signals from said counters are simultaneously at said second state.

3. The combination recited in claim 2 wherein said means detecting the crossing of a predetermined point is comprised of:
   a trigger adapted to provide first complementary signals indicative of whether said phase modulated reference signal is above or below said predetermined level;

a first flip-flop responsive to said first complementary signals and said clock pulses providing second complementary signals, one of said second signals being a first output signal; and a second flip-flop responsive to said second complementary signals and said clock pulses providing a second output signal delayed one clock period from said first output signal.

4. The combination as recited in claim 3 wherein said selector means comprises:

a flip-flop responsive to said second output signal for providing complementary output signals;

first gate means responsive to said first and second output signals and one of said complementary output signals providing said first enabling pulse; and second gate means responsive to said first and second output signals and the other of said complementary output signals providing said second enabling pulse.

5. The combination as recited in claim 4 wherein said counter means is comprised of an $m$-state counter where the number $m$ equals the number of clock pulses occurring during each cycle of said reference signal.

6. The combination as recited in claim 5 wherein said counter means is adapted to count $m-1$ pulses and to recycle to zero upon receipt of the $m$th pulse.

7. Apparatus for encoding a phase-modulated periodic information signal comprising in combination:

means responsive to said phase-modulated periodic information signal for producing enabling pulses, at least one such pulse being produced during a cycle of said phase-modulated periodic signal and at a predetermined level thereof and a plurality of enabling pulses being produced during successive cycles of said signal;

first and second pulse generating means, each having an output and an input, and each for producing at its output a pulse of a desired signal level and of a single predetermined duration in response to receipt of one of said enabling pulses at the input thereof;

pulse distributing means for transmitting said enabling pulses alternately to said inputs of said first and second pulse generating means;

detection means responsive to pulses at said outputs of said first and second pulse generating means, said detection means having first and second output terminals for producing an output pulse at said first output terminal when said first and second pulse generating means provide concurrent pulses of a predetermined combination of signal levels and for producing a pulse at said second output terminal when said first and second pulse generating means provide pulses of a second predetermined combination of signal levels.

8. Apparatus according to claim 11 further comprising in combination: a source of periodic clock pulses, said phase modulated signal having a period which is a function of a predetermined number of said clock pulse periods and said pulses at said first and second output terminals having a period which is a function of said predetermined number of said clock pulse periods.

9. Apparatus for encoding a phase-modulated information signal comprising in combination:

means responsive to said phase-modulated signal to produce a plurality of enabling pulses during at least a plurality of successive crossings of a predetermined reference level of the phase-modulated signal for detecting changes in phase thereof;

first and second pulse generating means, each having an output and an input, and each for producing at its output a pulse of a desired signal level and of a single predetermined duration in response to receipt of one of said enabling pulses at the input thereof;

pulse distributing means for distributing alternate enabling pulses to said first and second pulse generating means;

detector means having first and second detector output terminals and responsive to a predetermined period of said concurrent output pulses of said pulse generating means for producing a pulse at said first dector output terminal and responsive to absence of pulse output beyond a predetermined minimum period to produce a pulse at said second detector output terminal.

References Cited

UNITED STATES PATENTS

| 2,926,335 | 2/1960 | Bower | 235—92 X |
|---|---|---|---|
| 2,991,462 | 7/1961 | Hose | 340—347 |
| 3,092,718 | 6/1963 | Wullert | 235—92 |
| 3,209,348 | 9/1965 | Webb | 340—347 |
| 3,255,448 | 6/1966 | Saduary et al. | 340—347 |
| 3,357,012 | 12/1967 | Brook | 340—347 |

MAYNARD R. WILBUR, Primary Examiner

G. EDWARDS, Assistant Examiner